April 2, 1957 N. M. LOVETT 2,787,095
WHEEL TRUING DEVICE
Filed Aug. 8, 1955
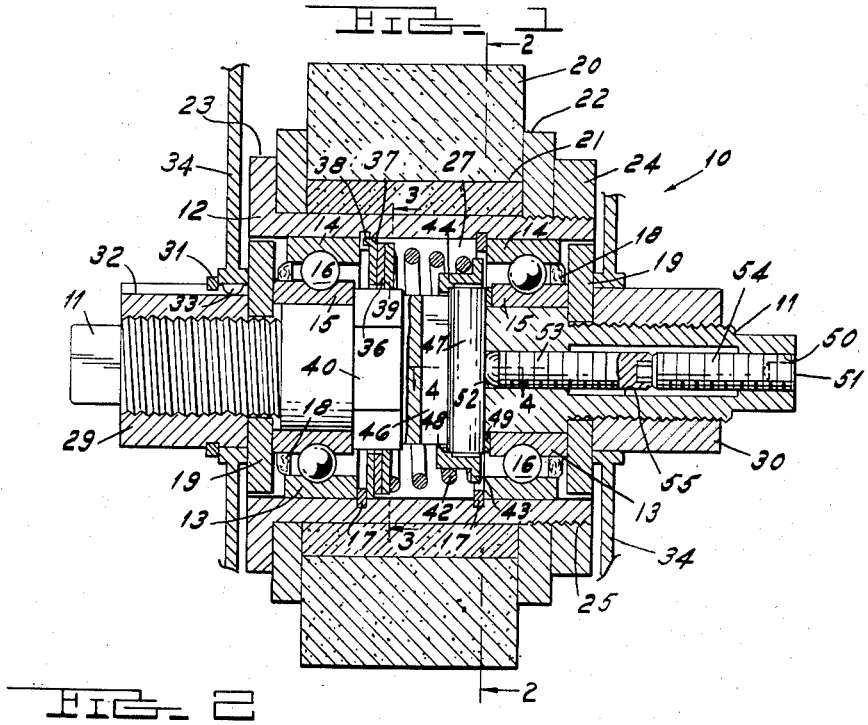
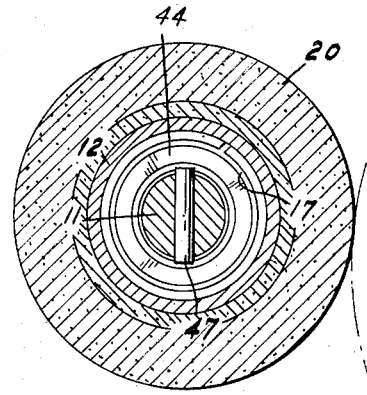
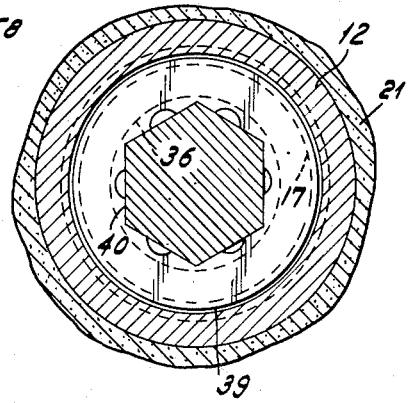
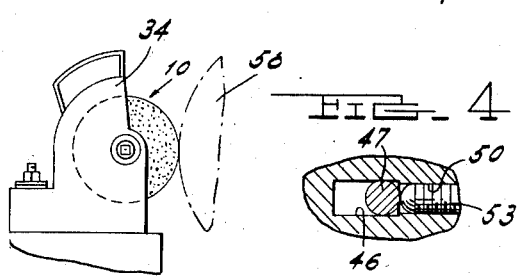
INVENTOR.
NICHOLAS M. LOVETT
BY
Barnes, Kisselle, Laughlin & Raisch
ATTORNEYS

2,787,095
WHEEL TRUING DEVICE

Nicholas M. Lovett, Detroit, Mich.

Application August 8, 1955, Serial No. 526,814

2 Claims. (Cl. 51—134.5)

This invention relates to a tool for truing or dressing grinding wheels.

The invention is particularly applicable to dressing tools of the type having a dressing wheel mounted on a hub which is rotatably supported on an axle and having a frictional drag mechanism for resisting relative rotation of the hub and axle. A tool of this general type is disclosed in Patent No. 2,704,060, issued on March 15, 1955, jointly to me and another inventor.

In some wheel dressing operations it is necessary to regulate the drag between the hub and the axle as the dressing progresses. This is especially true where the dressing wheel is formed of an abrasive grinding material which wears down substantially during a dressing operation. Heretofore it has been necessary to halt the dressing operation to effect the adjustment. An object of this invention is to provide a simple, inexpensive, improved structure having convenient means for regulating the drag while the tool is in actual operation.

Generally the invention is carried out by provision of an axial passageway in one end of the supporting axle with a screw threaded therein for axially shifting the seat for a spring which presses against abutted friction rings on the axle and hub. The axle projects outwardly of its supporting elements so that the frictional drag can be regulated while the device is in use by a tool inserted into the open end of the passageway. One form of the invention is shown in the accompanying drawings which may be briefly described as follows:

Fig. 1 is a generally sectional view of the assembled device.

Fig. 2 is a sectional view on line 2—2 of Fig. 1 on a smaller scale with a grind wheel to be dressed represented in phantom.

Fig. 3 is a sectional view on line 3—3 of Fig. 1.

Fig. 4 is a sectional view on line 4—4 of Fig. 1.

Fig. 5 is a smaller scale elevational view illustrating the device in use.

Shown in the drawings is a device 10 according to this invention having an axle 11 with a hub 12 rotatably mounted thereon by bearings 13 each composed of an outer race 14, an inner race 15 and interposed balls 16. The bearings are supported axially in spaced apart relation by snap rings 17 having a tight frictional fit with hub 12. Each bearing 13 preferably has a protective seal 18 and slinger washers 19 are preferably provided around the axle at the outer sides of the bearings for protecting the bearings against foreign material such as grit and water.

A dressing wheel 20 having a lead central bushing 21 with flanking washers 22 is clamped non-rotatably against a flange 23 at one end of the hub by a nut 24 threaded onto the other end of the hub as at 25. In the form of the invention shown, wheel 20 is formed of an abrasive material such as bonded silicon carbide, aluminum oxide or the like. The hub, axle and bearings define a chamber 27 which contains the frictional drag mechanism. The parts are secured in assembled relation by nuts 29 and 30 threaded onto axle 11 and clamping against the outer faces of slinger washers 19 as shown. One of the nuts 29 may be recessed to receive a snap ring 31 and may have an axial keyway 32 for a key 33 to facilitate mounting axle 11 non-rotatably on a support or housing 34.

The drag mechanism includes a friction ring 36 sandwiched between a plate 37 having a projection 38 locked between the ends of a snap ring 17 and a plate 39 having a central hexagonal opening fitting around a hexagonally shaped portion 40 of axle 11. Plates 36 and 37 are centrally apertured and spaced from hexagonal portion 40 as shown. Plates 37 and 39 may be made of steel and friction ring 36 may be formed of bronze.

A coil spring 42 disposed around axle 11 seats on plate 39 and reacts against a radial flange 43 on an axially cupped retainer ring 44 movably disposed around axle 11. The axle has a slot 46 underlying ring 44. A pin 47 is disposed in a radial direction in slot 46 and has end portions 48 projecting out of the slot into engagement with ring 44. Pin 47 is axially movable in the slot. An end play washer 49 is disposed between pin 47 and a bearing race 15. Washer 49 preferably comprises a shim pack, the number of shims being variable to compensate for wear in the bearings.

Axle 11 has an axial passageway 50 with an outer opening 51 at an outer end of the axle and an inner opening 52 adjacent pin 47. The passageway has inner and outer portions threaded to engage respectively an adjustment screw 53 and a locking screw 54 and has an intermediate enlarged portion 55. Screws 53 and 54 are preferably of the Allen head type as shown. Pin 47 projects across the inner opening 52 of passageway 50 and contacts screw 53 in the manner of a beam.

In use, axle 11 of the assembled device is mounted non-rotatably on housing or support 34 in the manner described with wheel 20 positioned to contact a grind wheel 58 which is to be dressed or trued. As the grind wheel is turned during the dressing operation it rotates wheel 20, hub 12, snap rings 17 and plate 37. Pressure plate 39 is secured against rotation by engagement with hexagonal portion 40 of the fixed axle. Spring 42 presses plates 36, 37 and 39 together to provide a frictional drag against relative rotation of the hub and axle. The drag causes a wearing action between wheels 20 and 58 which dresses or trues wheel 58.

The wheels are frequently rotated at several thousand revolutions per minute and dressing wheel 20 often has a much smaller diameter than wheel 58. Consequently, during the dressing operation, portions of the dressing wheel 20 may be worn away substantially, making it necessary to change the amount of drag provided by the friction plates in order to maintain the desired wearing action. This is accomplished by removal of locking screw 54 from passageway 50 to expose adjusting screw 53 and turning of the adjusting screw by means of an Allen wrench to shift pin 47 axially in slot 46. Retainer ring 44 moves axially with pin 47 to regulate the stress in spring 42 and thereby adjust the drag provided by the friction plates.

When the drag has been properly adjusted, locking screw 54 is replaced in passageway 50 and turned tightly against screw 53 to lock the latter in adjusted position. Subsequent drag adjustments, which may be necessary from time to time, may be made in the same manner. The drag adjustment can be made without removal of the device from support 34 and can be made while the device is actually being used in a wheel dressing operation. The axial depth of slot 46 is limited so that the drag mechanism cannot be tightened sufficiently to lock wheel 20 against rotation during an ordinary dressing operation.

I claim:

1. A wheel truing tool comprising, a housing adapted to be mounted on a support, said housing having an open side, an axle fixed on said housing and extending outwardly thereof, a hub having wheel dressing means thereon, said hub being rotatably mounted on said axle so that a portion of said wheel dressing means projects outwardly of said housing through said open side, said hub being hollow and cooperating with said axle to define a chamber, frictional drag means in said chamber, said frictional drag means being operative to resist rotation of said hub relatively to said axle, said frictional drag means including frictionally interengaging elements and stressed spring means influencing the same, said spring means seating against a shiftable member in said chamber, said axle having a passageway therein open exteriorly of said housing, adjustment means in said passageway operably connected to said shiftable member, said adjustment means being shiftable in said passageway for moving said shiftable member to regulate the stress in said spring means, said shiftable member having a predetermined maximum range of movement to limit the maximum stress creatable in said spring means by said adjustment means, said maximum stress in said spring means being less than the stress necessary to frictionally lock said hub against rotation relatively to said axle responsively to torque applied to said dressing wheel means in the normal course of its operation.

2. A wheel truing tool comprising, a housing having an open side and being adapted to be mounted on a support, a hollow axle fixed on said housing and extending outwardly thereof, a hollow hub having wheel dressing means thereon, said wheel dressing means projecting through said open side, at least two bearings interposed between said axle and said hub and mounting said hub rotatably on said axle, said hub having interior axially spaced grooves therein, a snap ring in each groove, said snap rings securing said bearings in axially spaced relation, at least one of said snap rings being split and having two ends, said ends being spaced apart to provide a gap when said snap ring is in said groove, said hollow hub and axle defining a chamber, frictional drag means in said chamber, said frictional drag means including a plate having a projection, said projection extending into said gap to lock said plate rotatably to said hub, friction plate means adjacent the first mentioned plate and secured rotatably to said axle, stressed spring means seating against said friction plate means and reacting against a shiftable element, axially shiftable means in said hollow axle exposed to the exterior of said housing, said axially shiftable means being operatively connected to said shiftable member so that the stress in said spring means can be regulated by shifting said adjustable means axially, said shiftable member having a predetermined maximum range of movement to limit the maximum stress creatable in said spring means by said adjustment means, said maximum stress in said spring means being less than the stress necessary to frictionally lock said hub against rotation relatively to said axle responsively to torque applied to said dressing wheel means in the normal course of its operation.

References Cited in the file of this patent

UNITED STATES PATENTS

| Re. 21,198 | Nardone | Sept. 5, 1939 |
| 2,277,134 | Nelson | Mar. 24, 1942 |

FOREIGN PATENTS

| 612,850 | France | Aug. 9, 1926 |